United States Patent [19]

Nielsen et al.

[11] 4,216,120
[45] Aug. 5, 1980

[54] ANTIMONY CONTAINING FINES PLUS CRACKING CATALYST COMPOSITION

[75] Inventors: Richard H. Nielsen; Dwight L. McKay; Glenn H Dale, all of Bartlesville, Okla.

[73] Assignee: Phillips Petroleum Company, Bartlesville, Okla.

[21] Appl. No.: 920,617

[22] Filed: Jun. 29, 1978

Related U.S. Application Data

[62] Division of Ser. No. 773,234, Mar. 1, 1977, abandoned.

[51] Int. Cl.$^2$ .................... B01J 31/18; B01J 29/16; B01J 29/26; B01J 29/36
[52] U.S. Cl. .................... 252/430; 252/437; 252/455 R; 252/455 Z

[58] Field of Search .............. 252/455 R, 455 Z, 412, 252/416, 417, 418, 430, 437, 414; 208/113, 120, 48 AA

[56] References Cited

U.S. PATENT DOCUMENTS

| 3,711,422 | 1/1973 | Johnson et al. | 252/414 |
| 4,025,458 | 5/1977 | McKay | 252/416 |
| 4,036,740 | 7/1977 | Readal et al. | 208/120 |

Primary Examiner—P. E. Konopka

[57] ABSTRACT

Used cracking catalyst fines from a cracking process wherein antimony or a compound thereof is used as a metals passivation agent are used as an efficient passivation agent in a cracking process.

3 Claims, 1 Drawing Figure

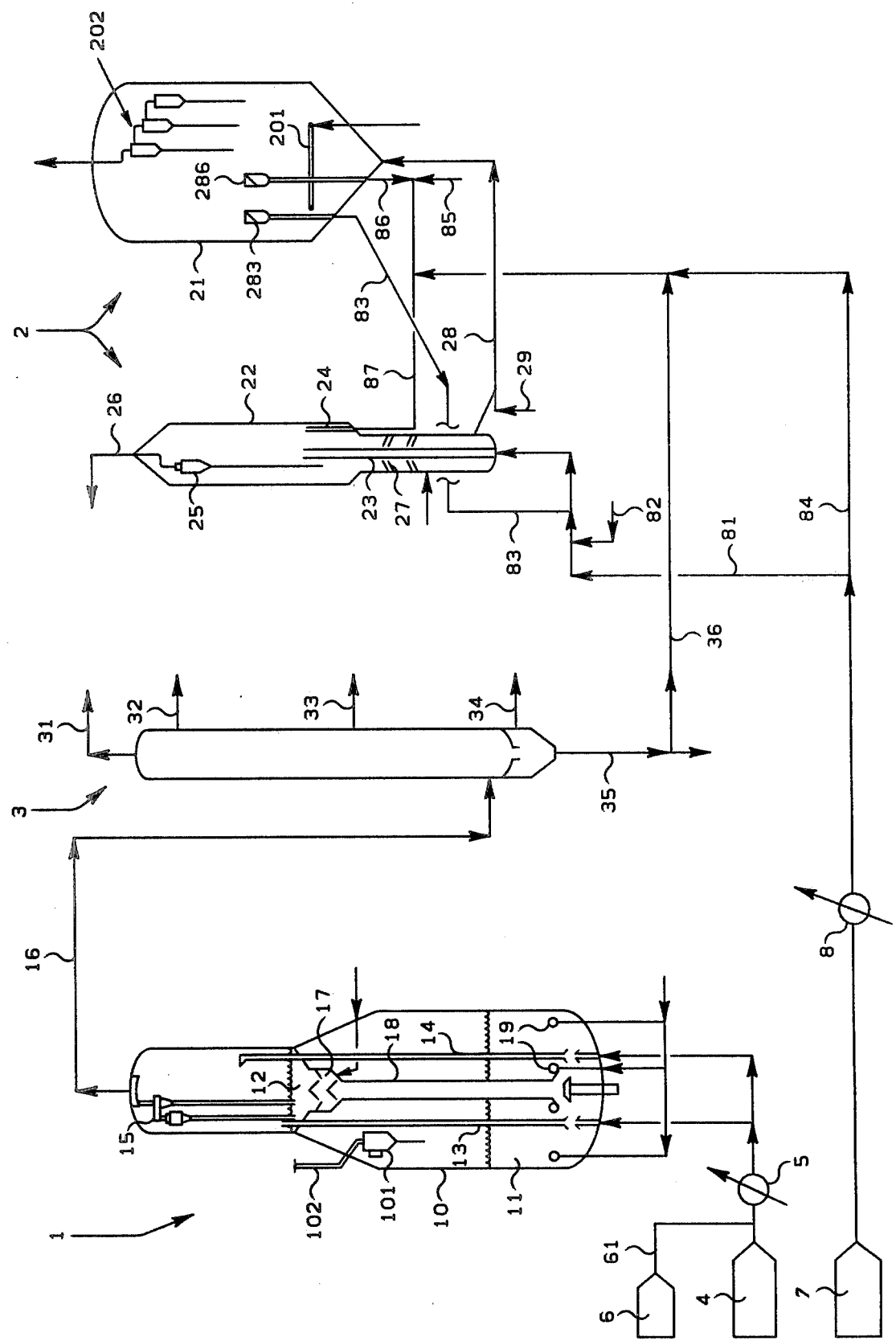

ANTIMONY CONTAINING FINES PLUS CRACKING CATALYST COMPOSITION

This application is a division of copending application Ser. No. 773,234, filed Mar. 1, 1977, and now abandoned.

This invention relates to the cracking of hydrocarbons. In one of its more specific aspects, this invention relates to the passivation of metals in a hydrocarbon cracking process. In another aspect, this invention relates to a novel passivation agent.

BACKGROUND OF THE INVENTION

Metals such as nickel, vanadium, and iron which are present in hydrocarbon feedstocks are known to have detrimental effects on the performance of a cracking catalyst used to crack such a hydrocarbon feedstock. Efforts have been made to mitigate these detrimental effects by passivating these metals. Antimony, antimony oxide, and other compounds of antimony have been proposed for this passivation. Antimony and its compounds, are, however, fairly expensive chemicals, and the most efficient use thereof constitutes an important economic goal.

THE INVENTION

It is one object of this invention to provide a new process for passivating metals in a cracking process.

Another object of this invention is to provide a new cracking process in which metals are passivated.

Yet a further object of this invention is to provide a new passivating agent.

These and other objects, advantages, details, features, and embodiments of this invention will become apparent to those skilled in the art from the following detailed description of the invention, the appended claims, the examples, and the drawing which shows a schematic diagram of a hydrocarbon cracking plant with two cracking-regeneration loops.

In accordance with this invention, it has surprisingly been found that the catalyst fines from a catalytic cracking process in which metals such as nickel, vanadium, and iron have been subjected to passivation with antimony, or a compound of antimony, are an excellent passivating agent. More specifically, it has been discovered that the antimony concentration on these catalyst fines can be several times higher than the antimony concentration of the total catalyst system employed in the catalytic cracking process from which these fines have been taken.

Thus in accordance with a first embodiment of this invention, there is provided a process for passivating metals on a cracking catalyst used for cracking hydrocarbons wherein the cracking catalyst as used is combined with used antimony containing cracking catalyst fines. These fines have been removed from a hydrocarbon cracking process in which antimony or a compound of antimony has been previously used to mitigate the detrimental effects of metals on a cracking catalyst.

Another embodiment of this invention consists in a cracking process wherein a hydrocarbon feedstock and a cracking catalyst and an added passivating agent are contacted under cracking conditions to produce a cracked hydrocarbon mixture, and wherein the added passivating agent as used is cracking catalyst fines which have been removed from a hydrocarbon cracking process in which antimony or antimony compounds were used to mitigate the detrimental effect of metals.

A novel passivating agent is provided in accordance with yet a further embodiment of this invention. This novel passivating agent comprises used cracking catalyst fines withdrawn from a catalytic hydrocarbon cracking process in which antimony or antimony compounds have been employed for passivating metals.

The used cracking catalyst fines may be obtained from a different cracking process or may be obtained from the same cracking process to which they are added as the passivating agent. In both cases a passivating agent with high antimony concentration is added in the form of these fines. The present preferred embodiment involves withdrawing the catalyst fines from a first cracking process in which antimony or compounds thereof have been employed for mitigating the detrimental effects of metals, and introducing these used cracking catalyst fines into another cracking process in order to passivate metals.

Further embodiments of the invention involve one or more of the details disclosed in the following.

The cracking process in which the novel passivating agent can be employed for mitigating the detrimental effects of the metals can be any cracking process known in the art wherein there is no hydrogen addition. Such a cracking process generally comprises a cracking zone in which hydrocarbons and a cracking catalyst are contacted under cracking conditions to form a cracked hydrocarbon mixture. After separation from the cracked product, the cracking catalyst is regenerated continuously or batchwise by contacting the catalyst with a free oxygen-containing gas, preferably air, in order to burn off the coke and regenerate the catalyst. Most of the cracking operations use a cracking-regeneration system comprising a cracking zone and a regeneration zone in which loop system the catalyst is continuously circulated. These systems are also referred to as cracking-regeneration loops in the following. The cracking catalyst leaving the cracking zone before being introduced into the regeneration zone is generally stripped to remove entrained hydrocarbons. This is generally done by steam injection. The cracking process of this invention is carried out essentially in the absence of any added hydrogen.

The catalyst used in the catalytic hydrocarbon cracking process of this invention can be any known cracking catalyst, particularly a cracking catalyst useful for cracking hydrocarbons in the absence of added hydrogen. More specifically this catalytic cracking material can be any of those cracking catalysts conventionally employed in the catalytic cracking of hydrocarbons boiling above 400° F. (204° C.) for the production of gasoline, motor fuel, blending components, and light distillates. These conventional cracking catalysts generally contain silica or silica-alumina. Such materials are frequently associated with zeolitic materials. These zeolitic materials can be naturally occurring or they can be produced by conventional ion exchange methods such as to provide metallic ions which improve the activity of the catalyst. Zeolite-modified silica-alumina cracking catalysts are particularly applicable in this invention. Examples of cracking catalysts that can be used in accordance with this invention include hydrocarbon cracking catalysts obtained by admixing an inorganic oxide gel with an alumino silicate and alumino silicate compositions which are strongly acidic as a result of treatment with the fluid medium containing at least one rare earth cation and hydrogen ion, or ions capable of conversion to a hydrogen ion. Other cracking catalysts that can be used include crystalline, alumino silicate zeolites having the mordenite crystal structure. The fresh cracking catalyst material will generally be in particulate form having a particle size principally within the range of about 10 to about 200 microns. The pore volume of such a fresh cracking catalyst before steam aging thereof will generally be in the range of about 0.1 to about 1 cc/g. The surface area of such fresh cracking catalyst material generally will be in the area of about 50 to about 500 m$^2$/g.

Typical operating conditions, both for the cracking zone and for the regeneration zone, are within the ranges shown in the following table:

| | Cracking Zone: |
|---|---|
| Temperature: | 800° F. to 1200° F. (427°–649° C.) |
| Pressure: | Subatmospheric to 3,000 psig |
| Catalyst/Oil Ratio: | 3/1 to 30/1, by weight |
| | Regeneration Zone: |
| Temperature: | 1000° F. to 1500° F. (538°–816° C.) |
| Pressure: | Subatomspheric to 3,000 psig |
| Air (60° F., 1 atm): | 100–250 ft$^3$/lb coke (6.2–15.6 m$^3$/kg coke) |

The hydrocarbon feedstocks that are catalytically cracked in the process of this invention are oil feedstocks which are conventionally utilized in catalytic cracking processes to produce gasoline and light distillate fractions from heavier hydrocarbon feedstocks. These feedstocks generally have an initial boiling point above about 400° F. (204° C.) and include such fluids as gas oils, fuel oils, topped crudes, shale oils, oils from tar sands, oils from coal, and the like. By "topped crude" are meant those oils which are obtained as the bottoms of a crude oil fractionator.

The feedstocks utilized in the process of this invention will normally contain one or more of the contaminating metals nickel, vanadium, and iron. The concentration of these metals individually will normally be in the range of a few tenths of a ppm to a few hundred ppm, based on the feedstock used. The total content of those contaminating metals in the feedstock may be as high as about 0.1 percent.

The passivation of the metals in the feedstock in accordance with this invention is carried out utilizing either only the cracking catalyst fines as described or utilizing the cracking catalyst fines in addition to other means of mitigating the detrimental effects of such metals as nickel, vanadium, and iron. The antimony-containing cracking catalyst fines can be added anywhere to the cracking process. Preferably these antimony-containing fines are combined with hydrocarbon feedstock introduced into the cracking process. The fines can be either separated from a cracking process in which antimony is utilized for metals passivation and used as such, or the fines can be used in the form of a slurry oil removed from a cracking process. This slurry oil is usually the heavy bottom effluent from a fractionator to which the cracked hydrocarbon mixture withdrawn from the cracking zone of a cracking process has been fed. This cracked hydrocarbon mixture entrains cracking catalyst fines which have been found to be a highly efficient passivating agent. It is, however, also within the scope of this invention to utilize cracking catalyst fines leaving the regeneration zone with the flue gases. These catalyst fines can be separated from the flue gas, for example, by means of a cyclone. The preferred source of the used antimony-containing cracking catalyst fines is, however, the slurry oil because it has been found that the antimony concentration on these fines is particularly high.

The used cracking catalyst fines containing antimony and constituting the novel passivating agent of this invention have an antimony content which will vary in broad ranges depending upon the quantity of antimony present on the equilibrium catalyst of the cracking process from which these fines are removed. If in this cracking process a hydrocarbon feedstock with a particularly high metals content was used, the quantity of antimony used for passivation correspondingly will be high and thus the concentration of antimony on the catalyst will be even higher. As a general rule, the antimony concentration on the cracking catalyst fines will roughly be in the order of 2 to 40 times the antimony concentration on the total equilibrium catalyst. For a typical operation, the antimony concentration of the cracking catalyst fines removed from the cracking process, together with the cracked hydrocarbon mixture, will be in the range of about 0.4 to 10 weight percent of the catalyst fines. These weight percentages given are expressed as elemental antimony and relate to the antimony-containing catalyst as the base of 100 weight percent.

The particle size of the cracking catalyst fines containing the antimony is not particularly critical. As a general rule, however, these cracking catalyst fines will have a particle size so that approximately all the particles pass through a sieve of about 200 mesh (U.S. Sieve). Preferably, the cracking catalyst fines have such a particle size that the fines essentially all pass through a sieve of 325 mesh (U.S. Sieve).

The composition of the cracking catalyst fines containing the antimony is essentially the same as that of the cracking catalyst except for its antimony content.

The cracking process from which the used cracking catalyst fines containing antimony are removed is generally a cracking process as described in detail above. The mitigation of the detrimental effects of metals is achieved in such a cracking process utilizing elemental antimony, an inorganic antimony compound, or an organic antimony compound or mixtures thereof. This mitigation of the detrimental metal effects is either achieved by a passivation procedure or by utilizing a cracking catalyst which contains antimony as a fresh cracking catalyst, i.e., in its unused state. The term "antimony" generally is intended to refer to any antimony source, examples of which are given in the following. Examples of inorganic antimony compounds which can be used include antimony oxides such as antimony trioxide, antimony tetroxide, and antimony pentoxide; antimony sulfides such as antimony trisulfide and antimony pentasulfide; antimony selenides such as antimony triselenide; antimony tellurides such as antimony tritelluride; antimony sulfates such as antimony trisulfate; antimonic acids such as metaantimonic acid, orthoantimonic acid and pyroantimonic acid; antimony halides such as antimony trifluoride, antimony trichloride, antimony tribromide, antimony triiodide, antimony pentafluoride, and antimony pentachloride; antimonyl halides such as antimonyl chloride and antimonyl trichloride; antimonides such as indium antimonide; and the like. Of the inorganic antimony compounds, those which do not contain halogen are preferred. Although organic antimony compounds that are preferred for use in the preparation of the antimony-containing catalysts and for passivation contain about 3 to about 54 carbon atoms per molecule for reasons of economics and availability, organic antimony compounds outside this range also are applicable. Thus, organic polymers containing antimony can be employed as the organic antimony compound. In addition to carbon and hydrogen, the organic antimony compound can contain elements such as oxygen, sulfur, nitrogen, phosphorus, or the like. Examples of some organic antimony compounds which can be used include antimony carboxylates such as antimony triformate, antimony triacetate, antimony tridodecanoate, antimony trioctadecanoate, antimony tribenzoate, and antimony tris(cyclohexanecarboxylate); antimony thiocarboxylates such as antimony tris(thioacetate), antimony tris(dithioacetate) and antimony tris(dithiopentanoate); antimony thiocarbonates such as antimony tris(O-propyl dithiocarbonate); antimony carbonates such as antimony tris(ethyl carbonate); trihydrocarbylantimony compounds such as triphenylantimony; trihydrocarbylantimony oxides such as triphenylantimony oxide; antimony salts of phenolic compounds such as antimony triphenoxide; antimony salts of thiophenolic compounds such as antimony tris(thiophenoxide); antimony sulfonates such as antimony tris(benzenesulfonate) and antimony tris(p-toluenesulfonate); antimony carbamates such as antimony tris(diethylcarbamate); antimony thiocarbamates such as antimony tris(dipropyldithiocarbamate), antimony tris(phenyldithiocarbamate), and antimony tris(butylthiocarbamate); antimony phosphites such as antimony tris(diphenyl phosphite); antimony phosphates such as antimony tris(dipropyl phosphate); antimony thiophosphates such as antimony tris(O,O-dipropyl thiophosphate) and antimony tris(O,O-dipropyl dithiophosphate); and the like. Mixtures of two or more applicable substances comprising antimony can be employed.

The preferred way of mitigating the effect of metals in the cracking process from which the used antimony-containing fines are removed is to combine the hydrocarbon feedstock with an oil-soluble antimony compound. Among the oil-soluble antimony compounds, the antimony tris(O,O-dihydrocarbyl dithiophosphates) are the presently preferred antimony compounds. The hydrocarbyl radicals will generally have between 2 and 18 carbon atoms per radical and not more than about 90 carbon atoms per molecule; the lower alkyl radicals, particularly propyl, being preferred.

The used catalyst fines containing the antimony can be removed from the cracking process described either in a separate step in which the fine cracking catalyst particles are separated from coarser catalyst particles, or the cracking catalyst fines that unavoidably are entrained from the cracking process can be utilized. The latter procedure, namely, the separation of the cracking catalyst fines from the hydrocarbon cracking process by recovering those fines that are unavoidably withdrawn from the process anyway, is a presently preferred way of procuring these used cracking catalyst fines containing the high concentration of antimony. Those used cracking catalyst fines that are entrained with the cracked hydrocarbon mixture have been found to have the highest antimony concentration. The cracked hydrocarbon mixture, when processed in a separation zone, is separated into a slurry oil in which essentially all the catalyst fines are accumulated and one or more further hydrocarbon streams. This slurry oil can as such be used for passivation purposes because it contains the used cracking catalyst fines with the high antimony concentration, or the cracking catalyst fines can be separated from the oil and utilized as a passivation agent.

The quantity of used cracking catalyst fines containing antimony that is employed for passivating metals in the cracking process can vary in broad ranges and depends upon the antimony concentration on the cracking catalyst fines on the one hand and the metals concentration in the feedstock to be cracked on the other hand. As a general rule, the quantity of cracking catalyst fines will be such that the ratio of the weight of the antimony, calculated as elemental antimony introduced into the process by means of the cracking catalyst fines, to the weight of the contaminating metals introduced into the process by means of the feedstock will be in the range of about 0.05 to about 2.0.

The invention will yet be more fully understood from the following description of the drawing and the examples which are given to explain preferred embodiments of the invention but not to unduly limit the scope thereof.

In the drawing a schematic flow scheme for a preferred embodiment of the process of this invention is shown. The apparatus comprises two cracking-regeneration loops 1 and 2. In the first cracking-regeneration loop 1, the cracking zone 12 and the regeneration zone 11 are both located within one housing, the regeneration zone 11 being in the bottom of the housing, whereas the reactor or cracking zone 12 is located in the upper portion of the housing 10. Topped crude oil is fed from a topped crude oil source 4 through a preheater 5 into two riser reactors 13 and 14. The preheated topped crude eventually, together with other oils, picks up regenerated cracking catalyst from the regeneration zone 11 and is cracked in contact with this catalyst in the riser pipes 13 and 14. The cracked product leaves the reactor or cracking section through a cyclone system 15, which in the present case is shown as composed of two cyclones arranged in series. The cracked hydrocarbon products, together with some steam, leave the reaction or cracking zone 12 via line 16.

The catalyst moves from the cracking section 12 through a stripping zone 17 in which all the hydrocarbons are removed from the cracking catalyst by steam stripping, and via a pipe 18 into the regeneration zone 11. Air is introduced into this regeneration zone 11 by means of air nozzle rings 19. In this regeneration zone 11, coke is burned off from the spent catalyst and flue gases leave the housing 10 via the cyclone 101 and a pipe 102.

In order to passivate the metals that are contained in the topped crude oil fed into the loop 1 from the topped crude source 4, an antimony-containing passivating agent is admixed to the feedstock from a tank 6 containing the passivating agent via line 61. The passivating agent that is used in the following examples and that is presently preferred is antimony tris(O,O-di-n-propyl dithiophosphate).

The second cracking-regeneration loop 2 is functionally similar to the first loop. The regenerator and the cracker are, however, located in two different vessels. The gas oil for this second loop is fed from a gas oil source 7 via a gas oil preheater 8 into the cracking reactor 22. A major portion of the gas oil is fed via line 81 together with steam that is introduced via line 82 and regenerated cracking catalyst from line 83 into the first riser 23 of the reactor 22. A minor portion of the gas oil is fed via line 84 eventually, together with other oils such as cycle oils or decant oil, steam introduced via line 85 and regenerated cracking catalyst from line 86 leaving the regenerator via line 87, into the second riser 24 of the reactor 22. The gaseous mixed hydrocarbon cracking products leave the cracking reactor 22 via a cyclone 25 and line 26 for further processing.

The spent catalyst from the risers 23 and 24 is withdrawn from the narrower lower portion of the reactor 22 after having gone through a steam stripping zone 27 via line 28. Some air is admixed with the steam-stripped spent catalyst via line 29. In the regenerator 21 the catalyst is contacted with air introduced via nozzle pipe ring 201. The coke is burned off from the catalyst and the flue gases leave the regenerator via a three-cyclone system 202, the three cyclones being arranged in series. Regenerated catalyst leaves the regenerator via catalyst removal openings 283 and 286, respectively.

The mixed cracked hydrocarbon product leaving the first cracker-regenerator loop 1 via line 16 is introduced into a main fractionator 3. From this fractionator various hydrocarbon streams are removed. A first hydrocarbon stream comprising gasoline and light hydrocarbons is removed via line 31. A second hydrocarbon stream comprising light cycle oil is removed via line 32. A third hydrocarbon stream comprising heavy cycle oil is removed via line 33. A fourth hydrocarbon stream comprising decant oil is removed via line 34. Various details of the fractionator 3 such as reboilers, reflux means, etc., have been omitted from the drawing in order not to render the drawing too complicated because these details have no particular significance for the invention.

From the bottom of the fractionator 3, slurry oil consisting essentially of cracking catalyst fines (containing antimony) and oil is removed via line 35. A portion or all of this slurry oil is introduced via line 36, together with the smaller portion of the gas oil, into the second cracking-regeneration loop 2.

The passivating agent introduced into the first cracking-regeneration loop 1 from the antimony source 6 causes an efficient passivation of the metals contained in the topped crude oil. In accordance with this invention, it has been found that the cracking catalyst fines leaving this first cracking-regeneration loop constitute efficient passivating agents for passivating metals in a further cracking-regeneration loop. This result was surprising because it could not be assumed that the spent catalyst on which the antimony had already functioned as a passivating agent in connection with highly metal-loaded feedstock from source 4 would still have an advantageous effect on the cracking process in the loop 2 utilizing a less highly metal-loaded feedstock from source 7. It has, however, been found that the cracking catalyst fines, and particularly the fines entrained with the cracked hydrocarbon mixture via line 16, constitute a very efficient passivating agent. These cracking catalyst fines are contained in the slurry oil from fractionator 3 and are introduced as the passivating agent via lines 35 and 36 into the riser reactor 24 and thus into the cracking-regeneration loop 2. Specific details on the effect of these antimony-containing cracking catalyst fines on the cracking process will be shown and explained in the following example.

EXAMPLE

In a plant as described in connection with the drawing, a metal passivation operation was carried out in connection with a cracking process to mitigate the detrimental effect of such metals as nickel, vanadium, and iron on the results obtained. In a first cracking regeneration loop, which was a heavy oil cracking unit, 30,000 barrels per day of topped crude oil were cracked. The topped crude oil was topped West Texas crude and it contained about 8 ppm nickel, about 13 ppm vanadium, and about 38 ppm iron. Into the feed stream to this heavy oil cracker, antimony tris(O,O-dipropyl dithiophosphate), commercially available under the trademark Vanlube 622 from the Vanderbilt Corp., was injected for passivation purposes. The hydrogen production, as well as the coke production, were significantly reduced by this procedure and the gasoline yields were increased.

The cracked hydrocarbon product withdrawn from this heavy oil cracking unit was introduced into a separator in which this product stream which contained some cracking catalyst fines was separated into hydrocarbons that were essentially free of catalyst fines and a slurry oil which contained essentially all the entrained catalyst fines. About 0.7 weight percent of this slurry was cracking catalyst fines.

About 30,000 bbls/day of feedstock consisting essentially of gas oil, about 20 volume percent topped crude, and about 5 volume percent of the slurry oil from the heavy oil cracking unit as described were introduced into a second catalytic hydrocarbon cracking process comprising a cracking-regeneration loop. This combined feed introduced as the main hydrocarbon feedstock contained about 2 ppm nickel, about 3 ppm vanadium, and about 10 ppm iron. It has been found that the introduction of the slurry oil containing the catalyst fines with antimony caused substantial reduction of both hydrogen and coke production in this second unit. In order to determine whether a further improvement of the metal passivation in the gas oil cracker could be achieved by the addition of antimony tris(O,O-dipropyl dithiophosphate) to the gas oil feedstock, this composition was added to the feedstock in a quantity resulting in 26 lbs. of antimony addition per day. The results of the coke and hydrogen production are shown in the following table in which Run 1 refers to the coke and hydrogen production in the operation where the catalyst fines introduced via the slurry oil contained no antimony (Run 1), in which the cracking catalyst fines contained antimony in such a quantity that about 50 lbs. of elemental antimony were introduced into this system per day (Run 2), and in which in addition to the 50 lbs. of antimony per day introduced by means of the slurry oil, an additional 26 lbs. of elemental antimony were introduced by means of the addition of dithiophosphate as described (Run 3).

| Run | Antimony Addition, lb/day to Gas Oil Cracker | | Coke Wt. % of feed | Hydrogen cu.ft./bbl. Converted |
|---|---|---|---|---|
| | Via Slurry Oil | Via Direct Addition of $(nC_3H_7-O)_2-\underset{\underset{S}{\|\|}}{P}-S)_3Sb$ | | |
| 1 | 0 | 0 | 7.21 | 164 |
| 2 | 50 | 0 | 6.63 | 95 |
| 3 | 50 | 26 | 6.78 | 114 |

The results shown in the table above demonstrate that both coke and hydrogen production dropped significantly when the gas oil cracker received as the passivation agent the slurry oil from the heavy oil cracker which contained the cracking catalyst fines with antimony. The further addition of antimony tris(O,O-dipropyl dithiophosphate) did not result in further benefits. This, however, only means that the antimony injected to the gas oil cracker by means of the slurry was probably sufficient for the reduction in coke and hydrogen production and thus for the increase in the production of useful hydrocarbon products. These results shown appear to be surprising because the cracking catalyst fines from the heavy oil cracker not only contained antimony but also achieved an important passivation effect throughout the total catalyst circulated in the gas oil cracker, although the catalyst fines in the slurry oil introduced into the unit constitute a minor quantity compared with the total quantity of catalyst circulated. Specifically, the total quantity of catalyst present in the gas oil cracker is about 600 tons of which 6 tons are replaced every day. A quantity of about 2 tons of cracking catalyst fines per day is introduced into the gas oil cracker by means of the slurry oil.

The catalyst fines contained in the slurry oil were investigated to determine their antimony content. Furthermore, the antimony content of those catalyst fines that left the regenerator together with the flue gas was determined. Furthermore, the antimony content of the equilibrium catalyst both of the heavy oil cracker and of the gas oil cracker was determined and finally the heavy metals content of both catalysts in the equilibrium was determined. The results are shown in the following table.

|  | Heavy Oil Cracker | Gas Oil Cracker |
|---|---|---|
| Sb content in slurry oil cracking catalyst fines | 1.4–3 wt. % | — |
| Sb content in cracking catalyst fines entrained in flue gas | 0.2–0.21 wt. % |  |
| Sb content in equilibrium regenerator catalyst | 0.10–0.13 wt. % | 0.04 wt. % |
| Heavy metals content of catalyst (Ni, V, Fe) | 1.5 wt. % | 1.3 wt. % |

The results of this table indicate a further surprising result. The antimony content in the slurry oil cracking catalyst fines is several times higher than the antimony content in the equilibrium regenerator catalyst. The data show that the antimony content in the fines entrained in the slurry oil is about 14 to about 30 times as high as the antimony content in the equilibrium regenerator catalyst. Furthermore, it has surprisingly been found that the cracking catalyst fines entrained in the flue gas leaving the regenerator contained a significant quantity of antimony which is, however, much lower than the quantity of antimony contained in the catalyst fines in the slurry oil. The reason for these unexpected and surprising results shown above is presently not fully understood.

Although the present invention has been described in detail above in connection with the use of the antimony-containing used catalyst fines from from one cracking process as the passivating agent for another cracking process, it is within the scope of this invention that these used antimony cracking catalyst fines can also be employed as a passivating agent in the same cracking process from which these fines have been separated. Due to the high antimony concentration on those fines leaving together with the cracked hydrocarbon mixture, these fines are the preferred passivating agent.

Reasonable variations and modifications which will become apparent to those skilled in the art can be made in this invention without departing from the spirit and scope thereof.

We claim:

1. A passivated cracking catalyst composition containing an antimony passivating agent said catalyst composition being useful for gas oil cracking and comprising
   (a) a cracking catalyst useful for gas oil cracking, and
   (b) as said passivating agent, used cracking catalyst fines containing 0.4 to 10 wt. % of antimony based on antimony containing fines which used cracking catalyst fines have been withdrawn from a heavy, highly metal loaded oil cracking process, in an amount sufficient to mitigate the detrimental effects of metals.

2. The passivated cracking catalyst composition in accordance with claim 1 wherein the antimony containing fines have been withdrawn from said heavy oil cracking process wherein an organic antimony thiophosphate compound had been employed.

3. The passivated cracking catalyst composition in accordance with claim 2 wherein said antimony compound is antimony tris (O,O dihydrocarbyl dithiophosphate).

* * * * *